(12) United States Patent
Blaisdell

(10) Patent No.: US 9,032,060 B2
(45) Date of Patent: May 12, 2015

(54) AGENT-BASED BANDWIDTH MONITORING FOR PREDICTIVE NETWORK SELECTION

(75) Inventor: James Blaisdell, Novato, CA (US)

(73) Assignee: Mocana Corporation, San Francisco, CA (US)

( * ) Notice: Subject to any disclaimer, the term of this patent is extended or adjusted under 35 U.S.C. 154(b) by 454 days.

(21) Appl. No.: 13/232,653

(22) Filed: Sep. 14, 2011

(65) Prior Publication Data

US 2012/0066366 A1    Mar. 15, 2012

Related U.S. Application Data

(60) Provisional application No. 61/382,548, filed on Sep. 14, 2010.

(51) Int. Cl.
*G06F 15/173* (2006.01)
*G06F 15/16* (2006.01)
*H04W 48/18* (2009.01)

(52) U.S. Cl.
CPC ..................... *H04W 48/18* (2013.01)

(58) Field of Classification Search
CPC ..... H04W 48/16; H04W 48/18; H04W 48/20; H04W 48/02; H04W 48/04; H04W 48/06; H04W 48/12; H04W 48/00
USPC ......... 709/223, 201, 202, 203, 204, 217, 218, 709/219, 220, 221, 222, 224, 225, 226, 227, 709/228, 229
See application file for complete search history.

(56) References Cited

U.S. PATENT DOCUMENTS

| | | | |
|---|---|---|---|
| 2005/0153697 A1* | 7/2005 | Patel | 455/442 |
| 2007/0033197 A1* | 2/2007 | Scherzer et al. | 707/10 |
| 2008/0014940 A1* | 1/2008 | Parron et al. | 455/436 |
| 2008/0045234 A1 | 2/2008 | Reed | |
| 2008/0188228 A1* | 8/2008 | Pecen et al. | 455/449 |
| 2010/0027426 A1* | 2/2010 | Nair et al. | 370/238 |
| 2010/0081428 A1* | 4/2010 | Maejima et al. | 455/426.1 |
| 2011/0286451 A1* | 11/2011 | Rabinovitz | 370/390 |

OTHER PUBLICATIONS

International Search Report dated Feb. 1, 2012 from International Application No. PCT/US 11/51576.
Written Opinion dated Feb. 1, 2012 from International Application No. PCT/US 11/51576.

* cited by examiner

*Primary Examiner* — Saket K Daftuar
(74) *Attorney, Agent, or Firm* — Beyer Law Group LLP

(57) ABSTRACT

A mobile device, such as a smartphone or a laptop, connects to a network based on the available bandwidth (throughput) of the network rather than on signal strength. The device may send a request containing the device's location to a service provider who has data on networks in the device's location and specifically on bandwidth or pipe performance. This data is used to determine which network in the area would be best to connect to. The network may be a network that does not necessarily have the highest signal strength (often shown as bars on a handset device). The service provider can cause the device to transition to the network having the higher bandwidth. It can also direct the user so that blackout areas are avoided using the network data maintained by the provider. The provider uses testers to obtain current bandwidth data of networks.

4 Claims, 5 Drawing Sheets

AGENT-BASED BANDWIDTH MONITORING FOR PREDICTIVE NETWORK SELECTION

CROSS-REFERENCE TO RELATED APPLICATIONS

This application claims the benefit under 35 U.S.C. Section 119 of U.S. Provisional Patent Application No. 61/382,548, titled "NETWORK IDENTIFICATION FOR DEVICES USING GLOBAL POSITIONING SERVICES (GPS)", filed Sep. 14, 2010, which is hereby incorporated by reference in its entirety.

BACKGROUND OF THE INVENTION

1. Field of the Invention

The present invention relates to computing devices and network selection. More specifically, it relates to network selection using bandwidth availability.

2. Description of the Related Art

Currently, mobile and nomadic devices frequently connect to a wireless network, primarily for Internet access but also for accessing a cellular network. Wireless networks may be found in numerous locations and are common in many geographical areas, but may are also not available in many places or provide weak or spotty coverage. A user is often able to see on her device, whether a smartphone, a tablet device, or a laptop, which wireless networks are available for her to connect to (some may be free and others may require a tariff or fee).

These wireless network connections emanate from wireless access points, towers, or other wireless network transmission devices that are close to the user. Each wireless network has a so-called "signal strength." This is often shown on a monitor or screen as a row of bars increasing in height (from left to right) to indicate how strong a signal is. This is by far the most prevalent way and often the sole visual indicator users use to determine which network they believe would provide the best coverage. The greater number of bars, the stronger the signal is. Users assume that the network with the highest number of bars will provide the best coverage and it is this network that the user connects to. Often this is the network that is closest to the user.

Network signal strength is typically found by performing a scanning function. That is, a device may be constantly scanning an area for available networks and storing data on each network's signal strength, or it may perform such scanning periodically. This scanning performed by the device, whether it is constant or periodic, consumes a significant amount of battery power. It is, in fact, a fairly power-intensive function and may drain a device's battery life. It would be preferable to not have the device constantly or intermittently perform this network scanning function so that the device can conserve power.

It would also be desirable if a device, when providing information to a user relating to available networks, provide more intelligence or information as to network strength. In some cases signal strength may not be the best indicator of which network to connect to. A network having the strongest signal strength may not be the best performing network available to the user. As described in the present invention, a network may also be measured by bandwidth. It would be desirable to use at least one other factor in selecting a network and preferably one that did not consume battery power of the device.

SUMMARY OF THE INVENTION

In one aspect of the invention, a method of selecting a network is described. A service provider receives a request from a mobile device or other computing device for bandwidth data for networks in the device's geographic location. The request contains the geographic location of the device which may be in the form of GPS coordinates. It may also be derived by other means, such as signal strength of networks in proximity to the device. Once the request is received, the service provider retrieves bandwidth data of the networks near the device from a database or repository. The database contains various types of data, including bandwidth data for networks, network identifiers, location data, and may also include signal strength data. The service provider transmits the bandwidth data to the device either over the Internet or via a cellular data network. The device then selects a network based on the bandwidth data it received and may not take into consideration the network's signal strength. Thus, the device may connect to a network that has the weakest signal strength (the conventional metric for selecting a network) but has the best throughput or pipe performance.

In another aspect of the invention, a method of a device transitioning from one network to another network with greater pipe performance is described. The device utilizes a current network for accessing data, the network having a current signal strength and a current bandwidth. The device wants to see if there is a faster network in the area and transmits a request to a service provider to select another network (or has a standing request to the service provider to always transition to a faster network). The service provider receives the request, which has the device's location, and checks a database to see if there are any networks in the same geographic area that have a higher bandwidth. The service provider sends this information to the device or causes the device to transition to another network that has a higher bandwidth. The new network may have a signal strength that is lower, equal to, or greater than the current signal strength.

In another aspect of the invention, a method of enabling a device to transition to a network based on bandwidth data is described. A service provider receives location data of a device, where the device is using a first network. The provider uses the location data to determine one or more networks in the same geographic area of the device by searching a database of network bandwidth data. The provider causes the transition of the device to a second network based on bandwidth data where the second network has higher bandwidth than the first network. The first network has a stronger signal strength than the signal strength of the second network.

In another aspect of the invention, a method of updating a network bandwidth database is described. A service provider obtains network bandwidth data and location data from a testing device at a specific geographic location. The provider uses the location data to identify one or more records in the network bandwidth database. The bandwidth data in the records is updated with the network bandwidth data received from the testing device, thereby maintaining the network bandwidth database with current bandwidth data. In one embodiment, the testing device obtains bandwidth or pipe performance data by conducting tests using high-volume test data. In another embodiment, real data used in actual downloads (or uploads) by users in a network is used to measure throughput. The testing device may be selected based on battery life of the testing device, wherein if battery life is below a specific threshold, the testing device is not eligible for testing. Other factors such as whether a user has opted-in or is a non-subscribing user may also be used in selecting a tester. In another embodiment, data from actual data transmissions performed by non-testing devices may be used to update the network bandwidth database in a random manner.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Figure 1:
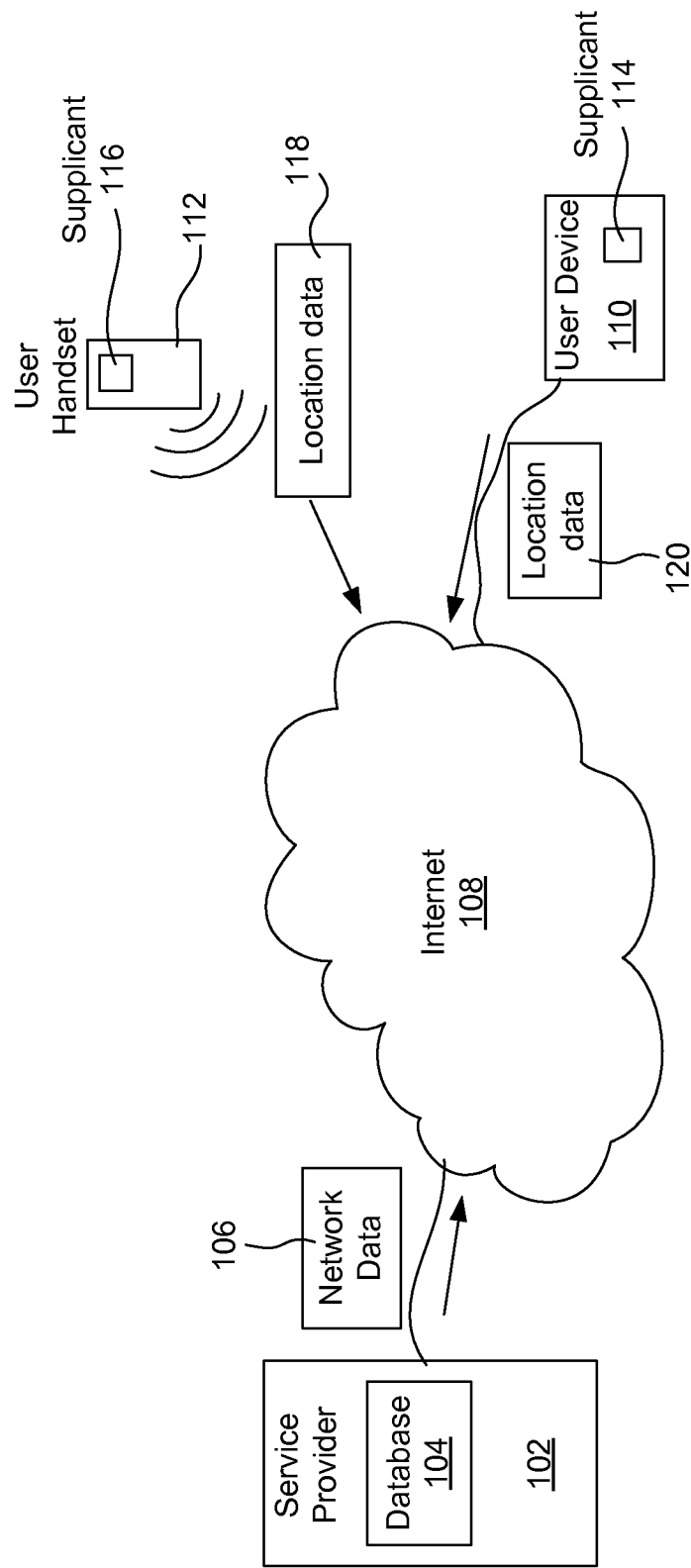
FIG. 1 is a simple network diagram showing a service provider server and a mobile device using a network selection service offered by the service provider in accordance with one embodiment.

Example embodiments of an application security process and system according to the present invention are described. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

The bandwidth grade or strength of a network may be used as a better indicator of which network will provide better overall performance for a mobile or other computing device. That is, it may provide a better indicator as to which network will enable faster transmission of data and, generally, provide better coverage. Notably, the network selected may not necessarily have the strongest signal. The access point or tower for the network that has the highest bandwidth may, in fact, be farther away from the user than towers and access points of other networks which may provide higher signal strength and are closer to the user. Methods and systems that enable a device to connect to a network that has the highest bandwidth grade or availability and to do so without having to necessarily perform a power-intensive scan of the area for networks or signal strength are described in the various figures. One of the key goals is to ensure or, at a minimum, provide the user with the most relevant information so that the user can select the best network to which to connect, taking into consideration not only bandwidth, but other factors such as tariffs, blackout areas, and so on, although bandwidth would be the primary and in some cases only factor.

The present invention may be described as agent-based bandwidth monitoring to enable predictive decisions by a mobile device as to which networks to connect to and when and how to do so. The mobile device contains an agent or supplicant (also referred to as a client) that may already be on a device and is given additional functionality to enable the present invention or is a new module used, at least initially, solely to implement the bandwidth and network determination functionality of the present invention. As noted, one of the primary goals of the present invention is to avoid constant network scanning by a device solely to determine signal strengths of networks.

In one embodiment, the invention utilizes a database operated by a service provider which provides network bandwidth data to users and enables their devices to automatically switch to networks having the highest bandwidth grade. The database generally contains data on location (e.g., GPS coordinate) and network availability, network bandwidth, and may contain other information, such as network signal strength. Location data may be obtained from tower IP, wireless access points or through other known means. The network bandwidth data may be obtained using tester or sensor devices operated by actual users of the service. These testers provide bandwidth and latency information on the networks in their area to the service provider. The number of testers may vary depending on the number of users in the user base of the service (e.g., there may be one tester for every 500 users or 1000 users). These testers may be selected randomly but may be required to meet certain criteria. For example, a tester's device should have adequate or sufficient battery life to conduct between testing without putting the tester in jeopardy of losing power because of the testing. A user in the system who has low battery life should not spend that remaining power on performing expensive network scanning. Only those users who have above a certain amount of battery life (a threshold amount, e.g., 75%) may be eligible to be a tester. Another factor may be that a tester is someone who is using the service for free and not a paying subscriber. Testers may be selected from a pool of users who are using the service for free or who have not opted-out of being a tester. As noted, users of the system who opt-in to the service may be selected by the service provider as a tester or agent. A tester or sensor may not need to connect to a network to determine bandwidth.

A real user's location may be determined by a service provider using GPS if the service provider has a sufficiently high confidence level that the GPS is giving an accurate location. If not, the service provider can use signal strength of the networks around the user. However, in this case, the user will have to scan the area for network signal strength (as it conventionally does). In other embodiments, the service provider can use signal strength and GPS to determine the user's location.

As mentioned, the service provider manages a database of location, network, and bandwidth data. The database may be described as self-learning and grows by obtaining data from testers and non-tester users. That is, it gathers knowledge about network bandwidth data from users over time. As expected, the data on bandwidth of networks in certain areas may change frequently. A small number of random testers or agents may scan periodically, for example, every few seconds. Such testers or agents may check-in with the service provider by providing GPS location data. This may minimize impact on battery life of the agents. The service provider obtains the geographic location of the tester, which may include the tester's altitude, to find the best network connection based on bandwidth. This bandwidth testing information will then be stored in the database. The database can be organized generally as location and bandwidth grade or bandwidth grade and location. Further details on the testers and database are provided below. Generally it is desirable to minimize network scans made by the mobile device since this consumes power.

The tester's mobile device, such as smartphone, or laptop transmits a unique device identifier to the service provider via an Internet connection or cellular data network. This ID excludes any information identifying the actual user of the device to the service provider server. The identity of the actual user is not needed and, in one embodiment, is not obtained or is obfuscated by the service provider. The data transmitted may include tower ID, GPS location, and other data. The tester or agent may then scan or get a read on a certain number of the networks in the area (e.g., the first five) and another tester in the area may scan other networks in the area (e.g., networks six to ten), and so on. Other agents in the area can be used to scan the other networks. In this context, scanning may consist of downloading or uploading a large volume of data from each network to get a reading on bandwidth.

As is known in the art, it is generally necessary to send data over a network in order to obtain bandwidth data. This can be test data, which is typically large volumes of data, in order to get accurate bandwidth readings. In another embodiment, actual downloads, such as movie downloads and other larger data downloads performed by users may be used to measure bandwidth, in which case artificial test data is not needed. When a user using the service downloads content that is known to be over a certain volume, the system can take advantage of this "real life" action to measure bandwidth and need not always measure bandwidth via testing (i.e., artificially performing data downloads or transmissions solely for measuring bandwidth of the network). In other embodiments, it may consist of other means for obtaining bandwidth. In this manner, the service provider can build a picture or snapshot of network bandwidth in a particular area. This data is stored in the database for the benefit of other users of the system. In this manner, all users of the system benefit from the data being collected on network bandwidth. The database may be continuously updated or frequently updated by users who have mobile devices connected to network. For example, the service provider can obtain network bandwidth data on the networks that the users are connected to. In this manner, the bandwidth data in the database is continuously and randomly updated. If an area has been tested or is an area that has been recently certified, then no bandwidth testing of the area may be needed.

In another embodiment, the service provider may ensure that there are ways to test for bad or malicious devices and users, especially testers, who are sending false information to the service provider, such as misleading or skewed bandwidth data or signal strength data. This type of nefarious activity may be detected if there are other testers or users in the area who are sending very different data (e.g., data indicating all networks in the area have low bandwidth capability but one user indicates that one network has high bandwidth). For example, the service provider can look for statistical anomalies to filter out fake agents. A bad actor may send network bandwidth data that indicates that a certain network in an area has high bandwidth so that other users use that network, allowing the bad actor to get access to personal data. Such actors should be excluded from the system.

In one embodiment, if a mobile device already has a wireless client or supplicant, the same client may be modified according to the present invention to now examine bandwidth. As noted, one of the primary items of data that is transmitted back to the service provider is the location of the mobile device. In existing wireless clients that may be used for signal strength or other network services, this information is typically not needed.

One of the goals of the present invention is to obtain bandwidth and signal gradients for networks across spaces. When provided with location of a mobile device, the service provider can determine the best network to connect to based on what is known about the space. In some cases the device can send its direction and speed if appropriate, and the device may cache some of this information.

As described, in one embodiment of the present invention, a service provider maintains a database that contains data on network bandwidth. A user may subscribe to a service offered by the service provider which provides the user with network bandwidth data for networks that are in the user's area at a given time. The user's area may be determined using a GPS transmitter or component in the mobile/nomadic device. In one embodiment, the service provider can learn of the user's location through GPS. The database maintained by the service provider may have data such as tower ID, GPS coordinate, and network connection line speed ("pipe performance") of the particular tower at that GPS location. It may also have the conventional signal strength of the tower (Access point, TDMA, Wi-Max, etc.), outage data, date, and other ancillary data about the tower or access point. In one embodiment, the actual user data that may be used to identify a user is not stored in the database. The primary data is the GPS coordinate. If a user/subscriber is within that GPS coordinate, she is sent information stored in the database for each of the available networks, or at least some of the networks. This data includes pipe performance data which the device can use to select the best network. In another embodiment, the service provider selects the best network for the device. The database can grow with data about networks across spaces as it collects information from other subscribers. Thus, a user who has already been at a particular GPS coordinate can send, through her device, data on the bandwidth (pipe performance) of one, some or all of the networks in that area to the database. In this sense, the database becomes more intelligent as the number of users grows; it is essentially a "self-learning" database. In one embodiment, the database or data repository managed by the service may be organized by region or geographic location. Occasionally, the service provider may add randomness to test the system and make the network data more robust.

The process starts with a user/subscriber sending her GPS location to the service. The service may use this data to find corresponding records in the database (i.e., records having the same or a close GPS coordinate). Getting the user's location is the first step after which appropriate records are retrieved. After processing the data from these records, the service sends the user a listing of networks based on line speed (i.e., pipe performance) and the user can select one based on these criteria instead of the conventional signal strength. In other embodiments, the service can automatically choose the best performing network for the user. This may be useful when the user is moving (such as in a car or a train) and the network access points (typically publicly available access points) or towers are changing frequently. The service may select the network with the highest bandwidth for the user during each transition. In this respect the system may be described as predictive in that it will switch the network for the user based on bandwidth as the user transitions into different areas, spaces, altitudes or elevation, and so on. This eliminates the need for the device to constantly or intermittently be scanning for signal strength of available networks. This data would no longer be needed by the device, thus saving battery power for the device. Another goal is to essentially increase the device's ability to know what the best time is for devices to authenticate with an access point given that handshaking for authentication is expensive. This process may be referred to as intelligent switch-over.

These methods and systems save battery power of the device because the device does not have to continuously scan for networks and evaluate their signal strengths. Moreover, it provides the user with the best performing networks, that is, ones that will provide the greatest bandwidth or pipe performance, rather than networks that simply have the strongest signal strength.

In another embodiment, the service provider implements processes to help users avoid blackout areas based on bandwidth data. If the user was in a blackout area with no networks or has networks but no bandwidth, the service could inform the user to go in a specific direction (e.g., five blocks south or 0.5 miles east) to get a network that has available bandwidth. For example, the service provider may inform a user that if she goes in a certain direction or takes an alternative route, she will avoid blackouts. Related to this, the process may also have algorithms for checking when it may or may not make sense or be efficient for a user to take an alternative route to avoid a blackout area (e.g., travel two miles in alternative route to avoid a quarter-mile blackout area that is part of more direct route). The user may be informed that a blackout area may be short but may want to take the longer alternative route because she wants to stay connected to the network.

FIG. 1 is a simple network diagram showing a service provider server and a mobile device using a network selection service offered by the service provider in accordance with one embodiment. A service provider has a server 102 containing a database 104 for storing network bandwidth and other data. It sends network data 106 over the Internet 108 to user devices, such as a laptop 110 and a user handset device 112. Each device has an agent or supplicant 114 and 116 that sends location data and other data 118 and 120 to server 102. Supplicants 114 and 116 may already be existing modules on devices 110 and 112 performing other network related functions or may be new modules used solely for processing network bandwidth data.

Figure 2:
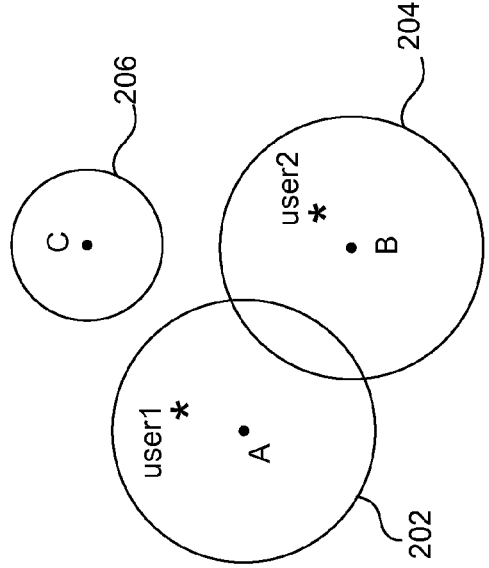
FIG. 2 is a network diagram showing three networks and two users.

FIG. 2 is a network diagram showing three networks and two users. A User1 is within the measurable signal strength of network A indicated by circle 202. A User2 is within the measurable signal strength of network B indicated by circle 204. A third network is shown as circle 206. The circles indicate signal strength and the closer a user is to the center of the circle, the stronger the signal strength will be (the center can represent a wireless access point or a tower). In this case, the signal strength for User1 in network A is stronger than the signal strength of network B. For User2, the reverse is true. The signal strength for User1 with respect to network C is stronger than it is for network B. Thus, in this case User1 would connect to network A and User2 would connect to network B. However, if the bandwidth for network C is higher than for both networks A and B, User1 and User2 will both connect to network C instead of to network A and B, respectively. Later, if the bandwidth information in the service provider's database changes and network B has a higher throughput, then the users will connect to network B, which also happens to have the strongest signal strength for User2.

Figure 3:
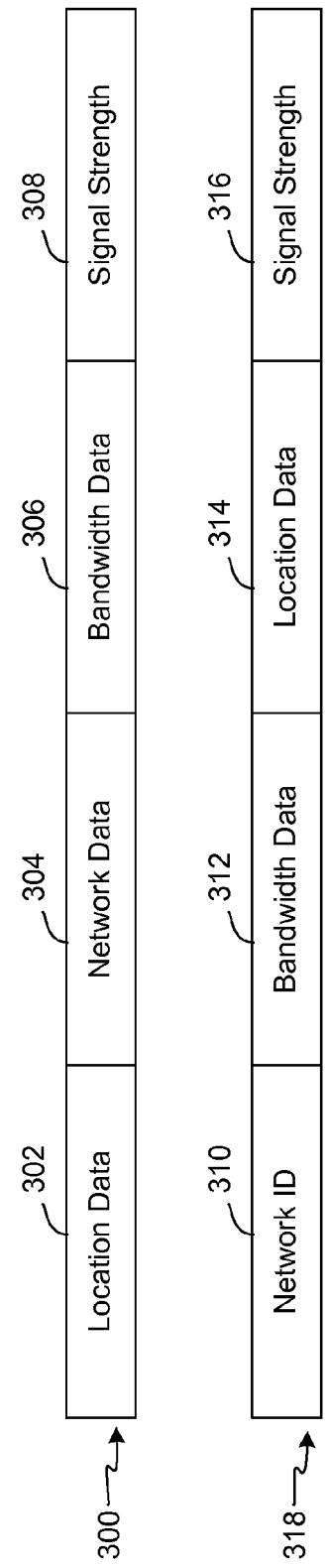
FIG. 3 is a block diagram showing two formats of a record in the service provider database in accordance with various embodiments.

FIG. 3 is a block diagram showing two formats of a record in the service provider database in accordance with various embodiments. A record 300 has four fields: location data 302, network ID 304, bandwidth data 306, and signal strength 308. In other embodiments, other fields may be included or record 300 may have fewer fields than shown here. In record 300 location data field 302 may be used to look up bandwidth data if the service provider receives location data from the user. A record 318 has a network ID field 310, a bandwidth data field 312, location data field 314, and signal strength field 316. Using this format, the service provider can use a network ID (e.g., network A) to look-up bandwidth data for a network if location data is not available or is not reliable. Which format is most suitable may depend partly on the resolution with respect to location and what is practical.

Figure 4:
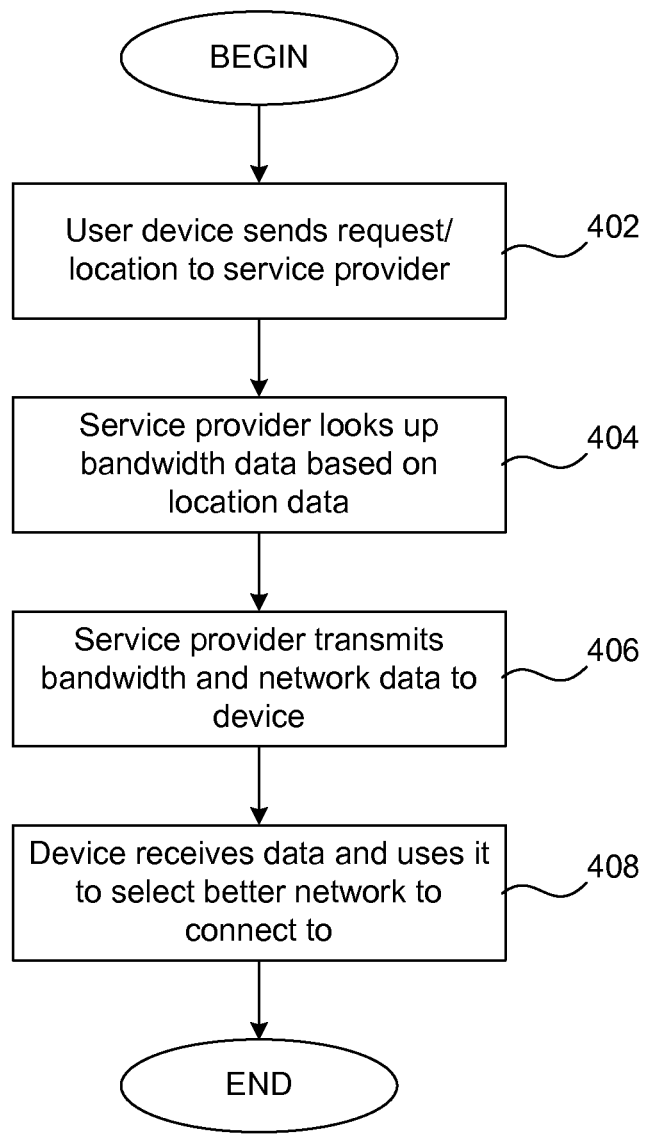
FIG. 4 is a flow diagram of a process of informing a user of a device of which network may be best with respect to bandwidth in accordance with one embodiment of the present invention.

FIG. 4 is a flow diagram of a process of informing a user of a device of which network may be best with respect to bandwidth in accordance with one embodiment of the present invention. At step 402 the user sends a request with the user's location to the service provider. In other embodiments, the location may not be available or reliable and the user may perform network scans which can be used by the service provider to determine location. At step 404 the service provider looks up bandwidth data based on the location data. This can be done using record format 300 shown above. In another embodiment, the network ID may be available and the service provider can use that to look up bandwidth data using record format 318. At step 406 the service provider transmits the bandwidth data and other network data to the device. In another embodiment, the service provider may make the decision about which network to connect to and send this data to the user or cause the user to transition to that network based on bandwidth (pipe performance). At step 408 the device receives the data and uses it to select a better network to connect to. This may also be done automatically by the device.

Figure 5:
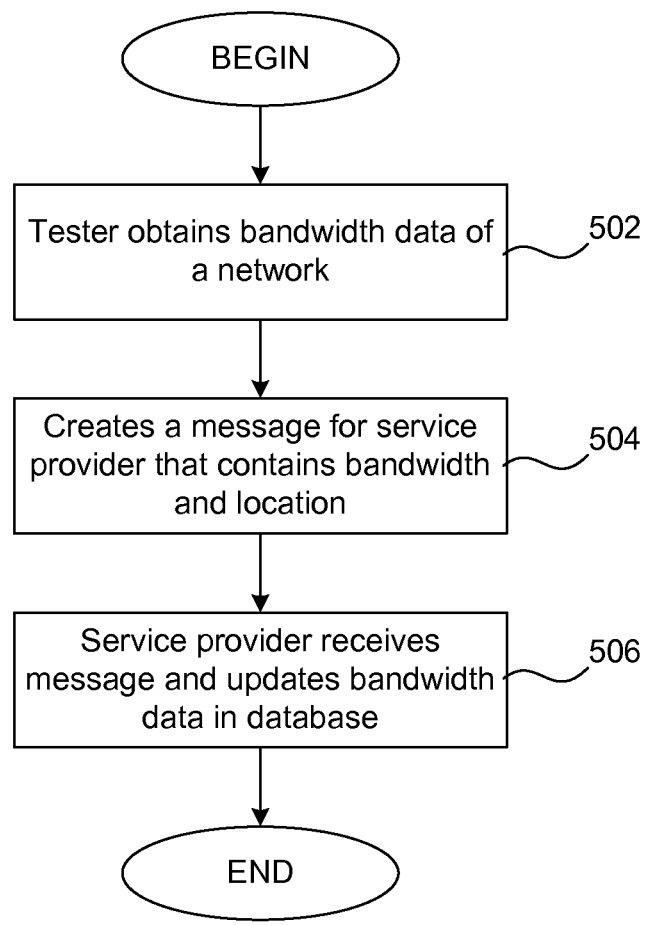
FIG. 5 is a flow diagram of a process of updating the network bandwidth database in accordance with one embodiment.

FIG. 5 is a flow diagram of a process of updating the network bandwidth database in accordance with one embodiment. At step 502 a tester or sensor device obtains bandwidth data of a network using any suitable means, such as using large volumes of test data or actual downloads. Once the tester device obtains bandwidth data on one or more networks in the tester's area, it creates a message with the bandwidth data and the tester's location and transmits it to the service provider at step 504. At step 506 the service provider receives the message and updates the bandwidth data in the database. In this manner, the bandwidth data is updated frequently and randomly to ensure that other users are receiving accurate bandwidth data for networks in their area.

Figure 6A:
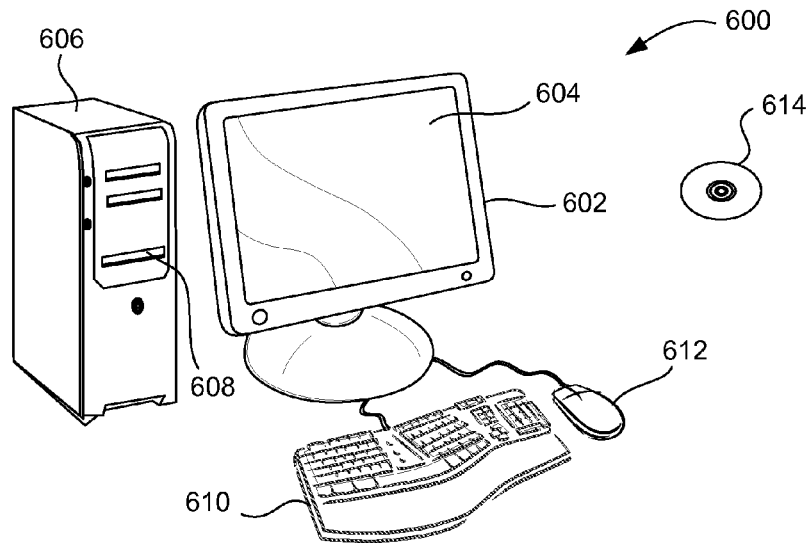
FIGS. 6A and 6B illustrate a computing system 600 suitable for implementing embodiments of the present invention.
Figure 6B:
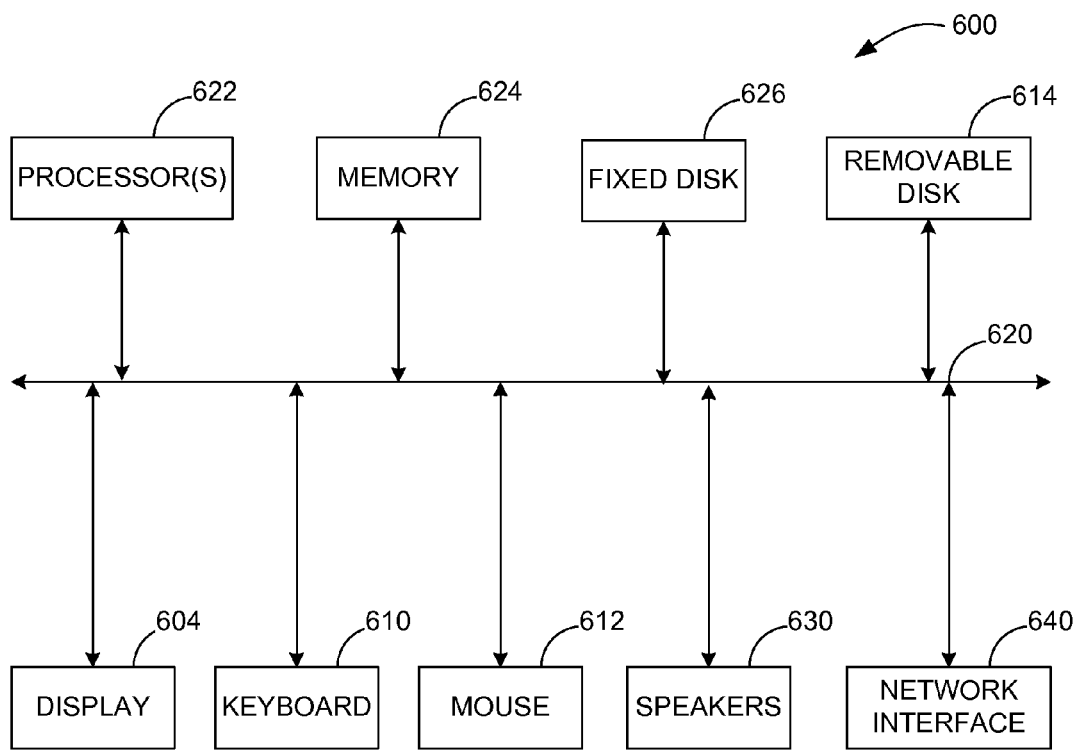

FIGS. 6A and 6B illustrate a computing system 600 suitable for implementing embodiments of the present invention. FIG. 6A shows one possible physical form of the computing system. Of course, the computing system may have many physical forms including an integrated circuit, a printed circuit board, a small handheld device (such as a mobile telephone, handset or PDA), a personal computer or a super computer. Computing system 600 includes a monitor 602, a display 604, a housing 606, a disk drive 608, a keyboard 610 and a mouse 612. Disk 614 is a computer-readable medium used to transfer data to and from computer system 600.

FIG. 6B is an example of a block diagram for computing system 600. Attached to system bus 620 are a wide variety of subsystems. Processor(s) 622 (also referred to as central processing units, or CPUs) are coupled to storage devices including memory 624. Memory 624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 626 is also coupled bi-directionally to CPU 622; it provides additional data storage capacity and may also include any of the computer-readable media described below. Fixed disk 626 may be used to store programs, data and the like and is typically a secondary storage medium (such as a hard disk) that is slower than primary storage. It will be appreciated that the information retained within fixed disk 626, may, in appropriate cases, be incorporated in standard fashion as virtual memory in memory 624. Removable disk 614 may take the form of any of the computer-readable media described below.

CPU 622 is also coupled to a variety of input/output devices such as display 604, keyboard 610, mouse 612 and speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon CPU 622 or may execute over a network such as the Internet in conjunction with a remote CPU that shares a portion of the processing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

What is claimed is:

1. A method of transitioning to a new network on a mobile device, the method comprising:
   utilizing, at the mobile device, a current network having a current signal strength and a current bandwidth;
   transmitting, from the mobile device, a request to select another network to a service provider server, wherein the service provider server:
   1) receives a request from the mobile device for bandwidth data of one or more networks in a geographic location of the mobile device;
   2) receives bandwidth data of the one or more networks from a database; and
   3) transmits the bandwidth data to the mobile device, wherein the database is updated by obtaining network bandwidth data and location data from a testing device at a specific geographic location, said location data used to identify records in the database and updating network bandwidth data in the records with network bandwidth data received from the testing device;
   selecting, by the mobile device, a new network having a higher actual bandwidth with respect to the current bandwidth and a lower actual signal strength with respect to the current signal strength: wherein the actual bandwidth and the actual signal strength are independent characteristics of the network and are unrelated to each other; and
   transitioning, within the mobile device, to the new network having the lower actual signal strength and the higher actual bandwidth.

2. A method as recited in claim 1 wherein the higher bandwidth is faster than the current bandwidth.

3. A method as recited in claim 1 further comprising:
   transmitting instructions to a user to avoid blackout areas.

4. A method as recited in claim 1 wherein data from actual data transmissions performed by non-testing devices are used to update the database in a random manner.

* * * * *